United States Patent
Hatcher

[15] 3,673,970
[45] July 4, 1972

[54] EARTHWORKING APPARATUS
[72] Inventor: John C. Hatcher, Charlotte, N.C.
[73] Assignee: Cole Manufacturing Company, Charlotte, N.C.
[22] Filed: March 27, 1970
[21] Appl. No.: 23,155

[52] U.S. Cl. .................................. 111/85, 172/268, 111/86
[51] Int. Cl. ...................................... A01c 5/00, A01b 61/04
[58] Field of Search .............. 111/85, 86; 172/266, 705, 264, 172/268

[56] References Cited

UNITED STATES PATENTS

| 3,527,307 | 9/1970 | Bushmeyer | 172/266 X |
| 3,049,181 | 8/1962 | Oerman et al. | 172/264 X |
| 2,981,213 | 4/1961 | O'Neil | 111/85 X |
| 875,211 | 12/1907 | Reeves et al. | 172/266 |
| 2,690,111 | 9/1954 | Altgelt | 172/266 |

Primary Examiner—Robert E. Pulfrey
Assistant Examiner—Stephen C. Pellegrino
Attorney—Parrott, Bell, Selzer, Park & Gibson

[57] ABSTRACT

An earthworking apparatus which includes a supporting frame, a foot piece, preferably of bell crank configuration, pivotally suspended at one end thereof from the supporting frame, and having an earthworking tool operatively secured to the other end. A toggle mechanism interconnects the bell crank foot piece intermediate ends thereof with the supporting frame. Spring means are connected to the fulcrum of the toggle mechanism and restrainingly maintain the earthworking tool in an operative position and allows the toggle mechanism to trip upon encountering an excessive draft condition and move the earthworking tool to a non-earthworking inoperative position and urge the return of the earthworking tool to the operative position upon removal of the excessive draft condition.

9 Claims, 5 Drawing Figures

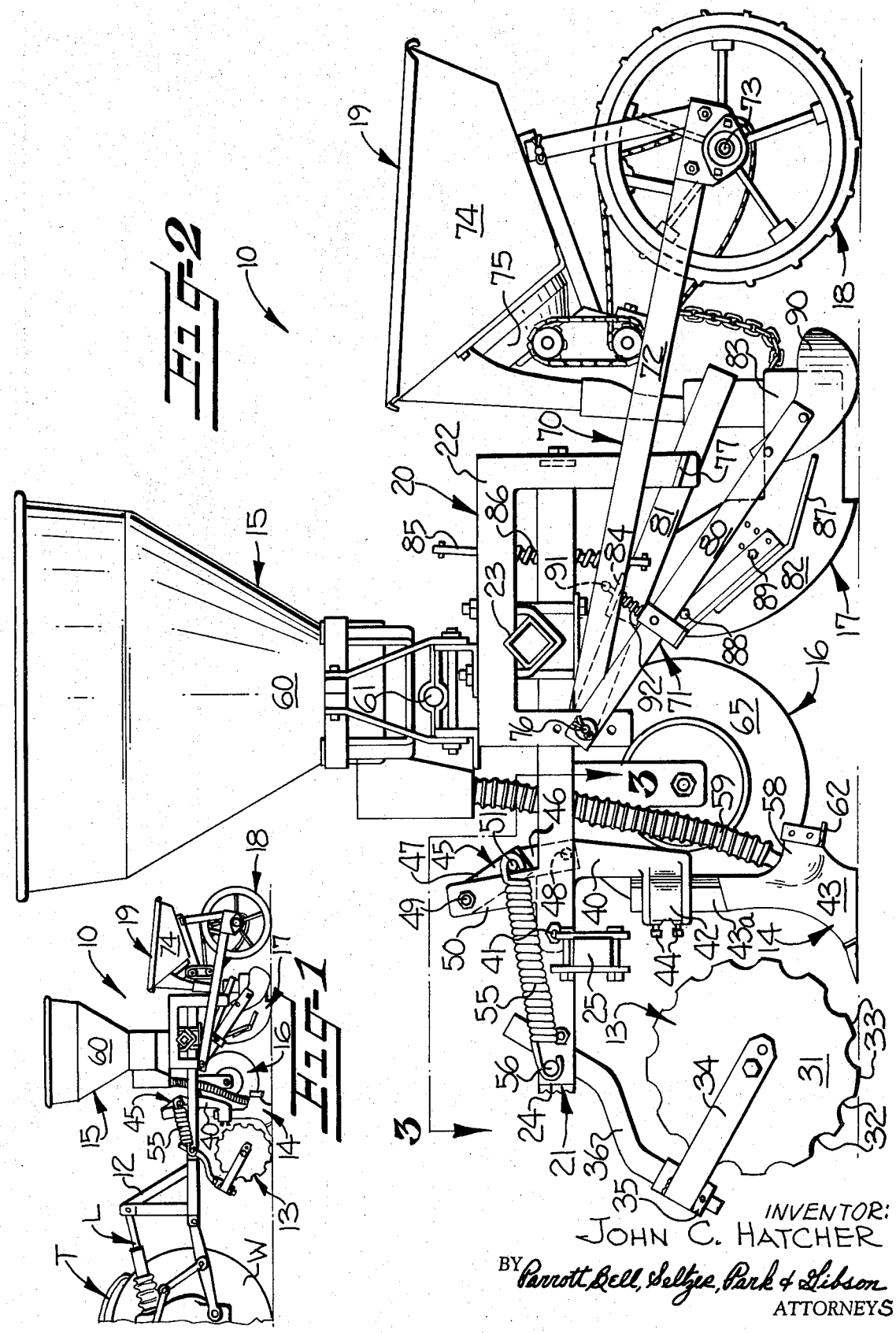

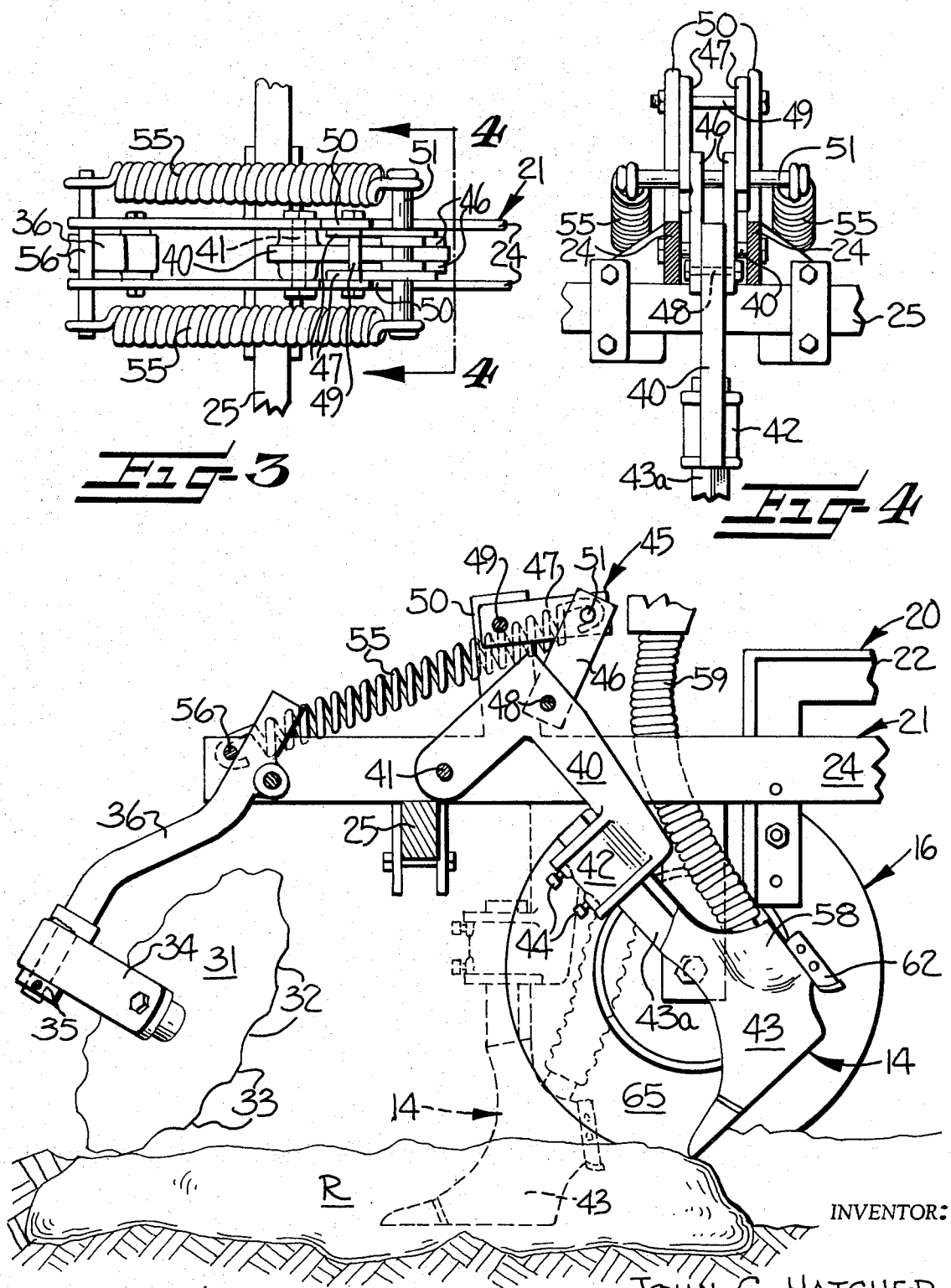

EARTHWORKING APPARATUS

This invention relates to an earthworking mechanism having particular utility in a planting apparatus and is characterized by the ability of the earthworking portion thereof to move from an earthworking operative position to a non-earthworking inoperative position upon encountering an excessive draft condition for preventing damage thereto and to return to the earthworking operative position upon the removal of the excessive draft condition.

In earthworking apparatus of all types, whether used alone or in combination with other agricultural implements such as in a seed planting apparatus, it is desirable that the earthworking portion of the apparatus be constructed to prevent damage thereto upon encountering a large bolder, root, or any other obstruction which might bend or break a portion of the apparatus and thus, require replacement of an expensive portion of the apparatus.

This problem has been avoided to some extent by suspending the earthworking portion of the apparatus such that an excessive draft condition will cause the earthworking portion to trip or release by some means and swing from an earthworking operative position to a non-earthworking inoperative position out of the way of the obstruction creating the excessive draft condition. Typically, the earthworking portion has been suspended from a supporting frame and maintained in an earthworking operative position by a shearing bolt which is designed to shear upon the earthworking portion of the apparatus encountering an excessive draft condition and release the same so that it may swing to an inoperative position. As will be apparent, upon shearing of the shearing bolt, it is necessary to discontinue use of the earthworking apparatus, return the earthworking portion to the operative position and replace the shearing bolt.

In order to alleviate the apparent shortcomings of earthworking apparatus of this type, trip mechanisms have been provided which, in addition to allowing the earth-working portion to move from an earthworking operative position to an inoperative position upon encountering an excessive draft condition, include self-restoring features for restoring the earthworking portion to an operative position upon removal of the excessive draft condition. Since these trip mechanisms are many and varied, a detailed discussion of their structure will not be presented here. It suffices to say that all the structures known to applicant include shortcomings which have been alleviated by the present invention. For instance, many of these apparatus rely solely on spring means for maintaining the earthworking portion of the apparatus in an operative position which position is highly unstable in that minor variations in the draft condition cause movement of the earthworking portion between a variety of operating positions. In addition, due to the responsive nature of such spring means, it is often difficult for the spring means to return the earthworking portion to the operative position.

Thus, it is an object of the present invention to provide an earthworking apparatus including an improved trip mechanism for allowing the earthworking portion of the apparatus to move from an earthworking operative position to a non-earthworking inoperative position upon encountering an excessive draft condition for preventing damage thereto and to return to the earthworking operative position upon removal of the excessive draft condition.

Another object of the present invention is to provide such an earthworking apparatus including means cooperating with the trip mechanism for facilitating the return of the earthworking portion of the apparatus to the operative position by relieving at least a portion of the weight of the earthworking apparatus from the earthworking portion so that the spring means of the trip mechanism may more readily return the earthworking portion to the operative position.

And still a further object of this invention is to provide in combination, a seed planting apparatus adapted to fertilize and plant seed at a uniform depth over the earth traversed by the apparatus including earthworking means characterized by the ability of the earthworking portion thereof to move from an earthworking operative position to a non-earthworking inoperative position upon encountering an excessive draft condition for preventing damage thereto and to return to the earthworking operative position upon the removal of the excessive draft condition while the remaining portions of the planting apparatus which are spaced from the earthworking means continue to carry out their functions but which upon encountering the same excessive draft condition likewise move from an operative position to an inoperative position and return to the operative position upon removal of the excessive draft condition.

Briefly, the objects of the present invention are obtained by providing an earthworking apparatus comprising a supporting frame, a foot piece preferably having a bell crank configuration and pivotally suspended at one end thereof from the supporting frame, an earthworking tool operatively secured to the other end of the bell crank foot piece and being movable with the bell crank foot piece to swing in a generally vertical direction between an earthworking operative position and a non-earthworking inoperative position. A toggle mechanism interconnects the bell crank foot piece intermediate ends thereof with the supporting frame. The toggle mechanism includes toggle links movable from a substantially on-center position in the earthworking operative position of the earthworking tool to an off-center position in the non-earthworking inoperative position of the earthworking tool. Spring means are preferably connected to the fulcrum of the toggle links for urging the toggle links toward the substantially on-center position to restrainingly maintain the earthworking tool in the operative position while allowing the toggle links to trip and move to the off-center position while the earthworking tool moves to the non-earthworking inoperative position and for urging the return of the toggle links and earthworking tool to the substantially on-center and earthworking operative position, respectively, upon removal of the excessive draft condition.

Preferably, the toggle links comprise a pair of toggle links of substantially the same length with the line of action of the spring means substantially bisecting the angle between the toggle links when the toggle links are in the substantially on-center position so as to maximize the efficiency of the spring means in restrainingly maintaining the toggle links in the substantially on-center position and in urging the return of the earthworking tool to the earthworking operative position upon movement thereof to a non-earthworking inoperative position.

Some of the objects of the invention having been stated, other objects will appear as the description proceeds, when taken in connection with the accompanying drawings, in which FIG. 1 is a side elevational view of a planting apparatus including the earthworking apparatus of the present invention and is there shown being operatively connected to a tractor for propelling or traversing thereof over the earth;

FIG. 2 is an enlarged side elevational view of the planting apparatus of FIG. 1 including the earthworking apparatus of the present invention and illustrating the earthworking portion of the earthworking apparatus in an earthworking operative position;

FIG. 3 is an enlarged top plan view with portions broken away of the earthworking apparatus of FIG. 1;

FIG. 4 is a sectional view taken substantially along the line 4—4 of FIG. 3; and FIG. 5 is an enlarged side elevational view of a portion of an apparatus of FIG. 2 and illustrating operation of the earthworking apparatus of the present invention upon encountering an obstruction which presents an excessive draft condition to the earthworking portion of the earthworking apparatus.

Referring specifically to the Figures there is illustrated a planting apparatus, generally indicated at 10, including an earthworking apparatus constructed in accordance with the present invention. With reference to FIG. 1, there is shown one of the rear wheels W of a tractor T including a conventional lifting apparatus L deriving its power from the tractor T and having the planting apparatus 10 connected thereto by hitch structure 12 for being propelled by the tractor T. The planting apparatus 10 to be hereinafter described is adapted for sod planting or planting wherein the ground has not been previously worked. While the planting apparatus 10 is here illustrated and described for single row planting, it is contemplated that the present invention is equally applicable to multi-row planting and that such modifications may be made as are necessary to accomodate the planting apparatus 10 to such operation within the scope of the present invention.

The basic elements of the planting apparatus 10 are sod opening means generally indicated at 13, first furrow opening means or earthworking means generally indicated at 14, means for dispensing material such as fertilizer generally indicated at 15, gauge means generally indicated at 16, planting furrow opening means generally indicated at 17, press wheel means generally indicated at 18, and seed dispensing means generally indicated at 19. These basic elements cooperate with one another when being propelled or traversed over the earth by a propelling machine such as a tractor T to open the sod being traversed, form a fertilizer receiving furrow, deposit fertilizer in the furrow, form a planting furrow, deposit seed into the planting furrow, and close the planting furrow while tamping the earth around the planted seed.

The planting apparatus 10 as will be apparent from the basic elements is divided into two sections which include an earth preparing section which includes the sod opening means 13, the first furrow opening means or earthworking means 14, the material dispensing means 15 and the gauge means 16, and a seed planting section which includes the planting furrow opening means 17, press wheel means 18 and seed dispensing means 19. The elements 13—19 will accordingly be hereinafter described as they are arranged to perform their respective functions.

As arranged, the basic elements are supported from a main supporting frame, generally indicated at 20, FIG. 2, and includes a leading frame 21 extending forwardly therefrom. In particular, the main supporting frame 20 includes a pair of spaced apart channel members 22 only one of which is shown which form a generally boxlike frame structure and a crossbar 23 extending laterally therebetween. The leading frame 21 includes a pair of parallel and spaced apart bars 24 only one of which is shown in FIG. 2 and are disposed between channel members 22 and are connected thereto at one end and are suspended by bracket means to the main frame 18, as illustrated, with the free ends of the bars 24 extending outwardly from the boxlike frame structure formed by main supporting frame 20. A crossbar 25 is connected by suitable bracket means, as illustrated, to bars 24 and extends transversely thereof and provides means for engagement of the planting apparatus 10 with the hitch structure 12 whereby the planting apparatus 10 may be readily hitched to a propelling machine such as a tractor T for propelling or traversing thereof over the earth to be planted.

The sod opening means 13 includes a circular blade 31 having circumferentially and equally spaced detents 32 therein which define cutting edges 33 therebetween for penetrating and opening the sod for the elements of the planting apparatus 10 to follow. The circular blade 31 is rotatably carried at the center thereof by an arm 34 which is welded or otherwise connected to a collar 35 that is pivotally mounted upon a suspension shaft 36 that is carried between the free ends of bars 24 and supports the rotary blade 31 in operative relation to the earth for opening sod traversed by the planting apparatus 10. Due to the mounting of the collar 35 and the suspension of shaft 36, the circular blade 31 is free to pivot to the left or to the right upon encountering an obstruction such as a rock, root or the like to prevent damage thereto.

The first furrow opening means or as hereinafter referred to the earthworking means 14 of the present invention is constructed for working the earth and includes material dispensing means 15 cooperating therewith for depositing fertilizer or the like in the furrow opened thereby. The earthworking means 14 comprises a foot piece 40 having a generally bell crank configuration which is pivotally suspended at one end thereof as at 41 between bars 24 and has a collar 42 disposed on the other end thereof for adjustably receiving an earthworking tool 43. As illustrated in FIG. 2, the earthworking tool 43 includes a shaft 43a slidably mounted in collar 42 which includes set screws or bolts 44 for securing the shaft 43a of earthworking tool 43 in a predetermined operative relation to the supporting frame 20. With the bell crank foot piece 40 being pivotally suspended at one end thereof, the earthworking tool 43 is movable therewith to swing in a generally vertical direction between an earthworking operative position, as shown in FIG. 2, and a non-earthworking inoperative position, as illustrated in FIG. 5.

In order to maintain the earthworking tool 43 in an operative position but which will allow the earthworking tool 43 to move from the earthworking operative position to a non-earthworking inoperative position upon encountering an excessive draft condition for preventing damage thereto and to urge return of the earthworking tool 43 to the earthworking operative position upon the removal of the excessive draft condition, a novel trip mechanism generally indicated at 45 is provided.

The trip mechanism 45 comprises a toggle mechanism including a pair of toggle links 46 and 47 which interconnect the bell crank foot piece 40 intermediate ends thereof with the leading frame 21. More particularly, one of the toggle links 46 is pivotally connected to the bell crank foot piece 40 intermediate ends thereof as at 48 and one end of toggle link 47 is pivotally connected as at 49 between upstanding posts 50 of each of the bars 24. The toggle links 46 and 47 are pivotally connected to each other at the free ends thereof and intermediate the connections to the bell crank foot piece 40 and upstanding posts 50 by a pin 51 which projects beyond opposite sides of links 46 and 47, FIGS. 3 and 4, for engagement with the spaced apart upstanding posts 50. As best illustrated in FIG. 2 when the earthworking tool 43 is in an earthworking operative position, the toggle links 46 and 47 are in a substantially on-center position and are movable from the substantially on-center position to an off-center position, FIG. 5, upon movement of the earthworking tool to a non-earthworking inoperative position.

The trip mechanism 45 further includes spring means in the form of a pair of spaced apart coil tension springs 55 having one end thereof suitably connected to opposite ends of pin 51, respectively, and the other ends suitably connected to the leading frame 21 and preferably, as shown in FIG. 3, to a pin 56 carried by bars 24 in an equivalent manner to provide uniform action thereof. Tension springs are preferred because of their uniform resistance to extension.

Preferably, the toggle links 46 and 47 are of substantially the same length and the tension springs 55 are connected between the pin 51 or fulcrum of the toggle links 46 and 47 and the leading frame 21 so that the line of action of the springs 55 pass through the fulcrum and substantially bisects the angle between the toggle links 46 and 47 when the toggle links 46 and 47 are in the substantially on-center position, as illustrated in FIG. 2, so as to maximize the efficiency of the springs 55 and their operation in restrainingly maintaining the toggle links 46 and 47 in the substantially on-center position and the earthworking tool 43 in an earthworking operative position. In addition to restrainingly maintaining the earthworking tool 43 in the operative position, the trip mechanism allows the toggle links 46 and 47 to trip and move from the substantially on-center position upon the earthworking tool 43 encountering an excessive draft condition to the off-center position, and the earthworking tool 43 to move to a non-earthworking inoperative position, as shown in FIG. 5. Furthermore, upon removal of the excessive draft condition as will be occasioned by the planting apparatus 10 having traversed over the obstruction, the tension springs 55 urge the return of the toggle links 46 and 47 and earthworking tool 43 to the substantially on-center position and earthworking operative position, respectively. As best shown in FIG. 3, the toggle links 46 and 47 are prevented from being moved beyond the substantially on-center position in the direction opposite to the off-center position by engagement or abutment of the opposite ends of the pin 51 with upstanding posts 50.

It has been found by the present invention that this construction and arrangement of the toggle mechanism and spring means maximizes the cooperation between the two to carry out the desired operation of an earthworking tool upon encountering an excessive draft condition to prevent damage thereto by allowing the earthworking tool to move from an earthworking operative position to a non-earthworking inoperative position and which will return to the earthworking operative position upon removal of the excessive draft condition.

The earthworking tool 43 includes a fertilizer boot or chamber portion 58 in which is received a flexible material supplying tube 59 that is also connected to a hopper 60 for supplying a dispensing material such as fertilizer and includes conventional means generally indicated at 61 for regulating the dispensing of the material in the hopper 60 into the supply tube 59 for passage to the boot 58 for depositing thereby in the furrow formed by the earthworking tool 43. The earthworking tool 43, as shown in the various figures, may include one or more furrow covering tools 62 which are operatively connected to the earthworking tool 43 for throwing earth back over the material deposited in the furrow by the material dispensing means 15.

In order to insure that the earthworking tool 43 operates at a desired and uniform depth, the planting apparatus 10 includes gauge means 16 in the form of a gauge wheel 65 which is rotatably carried by leading frame 21 for following the earth contour so that the planting apparatus 10 follows the contour of the earth. More particularly, the gauge wheel 65 is disposed in operative relation to the earthworking tool 43 to insure that the earthworking tool 43 operates at a uniform depth. The depth of working may be controlled by adjusting the position of the earthworking tool 43 relative to the bell crank foot piece 40. In addition the gauge wheel 65 relieves at least a portion of the weight of the planting apparatus 10 supported by the earthworking tool 43 when in the operative position so that the trip mechanism 45, previously described, is the controlling factor in maintaining the earthworking tool 43 in an operative position.

Furthermore, upon the earthworking tool encountering an obstacle such as a rock R, as shown in FIG. 5, which establishes an excessive draft condition against the earthworking tool 43, and moving to an inoperative position, the weight of the earthworking apparatus carried by earthworking tool 43 is relieved therefrom and carried by the gauge wheel 65.

Thus, the earthworking tool 43 may drag upon the surface of the earth without great likelihood of damage to the point of the earthworking tool 43 and more particularly, upon the removal of the excessive draft condition such as by passage of the planting apparatus 10 beyond the obstruction, the springs 55 will not have to overcome as much weight in returning the earthworking tool 43 to the earthworking operative position. This is particularly important because without the gauge wheel 65, the earthworking tool 43 may be moved to a highly unfavorable angle for re-entry into the earth upon removal of the excessive draft condition. However, by employing the gauge wheel 65, the earthworking tool 43 cooperates therewith so that its re-entry angle is not rendered unfavorable by the weight of the planting apparatus 10. By employing the flexible tube 59 between the boot 58 and hopper 60, the apparatus is not damaged by the swinging of the earthworking tool 43 to the inoperative position since the tube 59 will flex in movement thereof, as shown in FIG. 5, and return therewith to the operative position without damaging the same.

Having described the earth preparing section, the seed planting section of the planting apparatus 10 of the present invention will now be described and its cooperation with the earth preparing section for opening a furrow at a depth less than that to which the fertilizer was deposited for depositing seed in a controlled manner in the furrow opened, for closing and tamping the furrow in which the seed are dropped. While the seed planting section will hereinafter be briefly described, a more detailed description of the same is presented in U.S. Pat. application Ser. No. 779,034, now U.S. Pat. No. 3,598,069 entitled "Planter with Independently Movable Press Wheel and Furrow Opener" and assigned to the assignee of the present invention.

Briefly, the planting section includes first and second trailing frame means 70 and 71 each of which are carried by the main supporting frame 20. The press wheel means 18 and seed dispensing means 19 are mounted together on the first trailing frame means 70 for vertical movement upon engagement with obstructions or surface irregularities in the earth being traversed. The first frame means 70 is defined by a pair of trailing arm members 72 only one of which is shown which extend parallel one to another and mount the press wheel means 18 adjacent a free rearward end thereof for rotation about an axis defined by an axle 73.

The seed dispensing means 19 includes a hopper 74 for receiving seed to be planted and a seed plate means 75 disposed adjacent the lower side of the hopper 74 and including a moving chamber which is driven by suitable pulley and chain connections as illustrated by rotation of press wheel means 18 for dispensing the seed in predetermined relation to rotation of the press wheel means 18. Vertical movement of the press wheel means 18 and seed dispensing means 19 is obtained by mounting the first trailing frame means 70 from the main supporting frame 20 with a pivot pin 76 which penetrates the forward ends of the arms 72 of the first trailing frame means 70 and passes through a selected one of a series of mounting openings provided in the channel members 22. The plurality of pairs of openings are provided in the channel members 22 in order to permit an operator of the planting apparatus 10 to select the location for the pivot axis about which the first trailing frame means 70 moves. Lifting of the press wheel means 18 from the surface of the earth for transfer of the planter apparatus 10 from field to field by the lifting apparatus L of tractor T as required, is insured by providing stop members 77 on the rearward downward extending legs of channel members 22. Thus, on lifting the main supporting frame 20 downward movement of the first trailing frame 70 beyond the limit blocks or stops 77 is precluded.

The furrow opening means 17 is mounted by the second trailing frame means 71 for vertical movement independently of the first frame means 70 and of the press wheel means 18 so that the gravitation force acting downwardly on the press wheel means 18 is not transferred to and does not act on the furrow opening means 17. The second frame means 71 is of generally Y-shaped, bifurcated configuration and includes a pair of arm members 80 and 81 joined adjacent their forward extremity at the common point of the first trailing frame means 70. The furrow opening means 17 is mounted from the second trailing frame means 71 and is in the form of a sword member 82 which has a sharpened forward end for opening a seed receiving furrow in ground being traversed by the planting apparatus 10 and includes a rearward portion 83 defining a seed passage through which seeds drop from the seed dispensing means 19 in being planted. The furrow opening means 17 is mounted to the second trailing frame means 71 by welding of the seed passage portion 83 of the sword 82 between the free rearward ends of the trailing arms 80 and 81 and by means of a platform members 84 overlying and secured to the trailing arms 80 and 81 intermediate their lengths.

The platform 84 provides a lifting point to restrain the second trailing frame means 71 against excessive downward movement upon the planting apparatus 10 being raised for transport between fields. More particularly, a pair of pinned rod restraining members 85, inly one of which is shown, extend between the channel members 22 of the main supporting frame 20 and the platform 84 and limit the extent to which the second trailing frame means 71 and the furrow opening means 17 may drop on lifting of the planting apparatus 10.

Additionally, each of the rods 85 have a compression spring 86 wound thereabout which imposes a downward force on the platform 84. This biasing force insures that excessive vertical movement of the furrow opening means 17 does not occur.

In order to control the depth at which seed are planted, furrow opening means 17 has a sled plate 87 adjustably mounted on the sword 82 for movement about a pivot bolt 88 on removal of an adjusting bolt 89.

By engaging a relatively large area of earth adjacent the furrow opened by the sword 82, the sled plate 87 controls the depth of penetration of the sword 82 into the earth. Additionally, the weight of the sled plate 87 together with the weight of the sword 82 provides a downward bias normally insuring the formation of a furrow in the earth being traversed.

In addition to the basic elements of the planting apparatus 10, it is additionally contemplated that covering means may be provided in order to insure that seed dropped by the seed dispensing means 19 are properly covered before the furrow is tamped closed by the press wheel means 18. This function is served by spoon coverers 90, only one of which is shown, carried by and extending rearwardly from the furrow opening means 17. The spoon coverers 90 serve to throw a portion of the earth traversed by the planting apparatus 10 inwardly toward the furrow after seed have been deposited therein. A lifting or downward biasing force, as required for acting on the spoon coverers 90, is provided by guide pins 91 and compression springs 92, only one of each being shown, acting between the crossplate 84 of the second trailing frame means 91 and the coverers 90.

In the drawings and specification, there has been set forth a preferred embodiment of the invention, and although specific terms are employed, they are used in a generic and descriptive sense only and not for purposes of limitation.

What is claimed is:

1. In a planting apparatus adapted to be connected to a propelling machine, such as a tractor, and including a supporting frame means, planting furrow opening means carried by said supporting frame means for opening a furrow and being mounted for swinging vertical movement relative to said support frame upon engagement with surface irregularities and obstructions, press wheel means carried by said supporting frame means for closing a furrow opened by said opening means and being mounted for swinging vertical movement relative to said supporting frame means upon engagement with surface irregularities and obstructions, and seed dispensing means operatively connected to said press wheel means for depositing seed into a planting furrow opened by said furrow opening means prior to closure of the furrow by said press wheel means; the improvement therewith of earthworking means carried by said supporting frame means forwardly of said planting furrow opening means and being characterized by the ability of the earthworking portion thereof to move from an earthworking operative position to a non-earthworking inoperative position upon encountering an excessive draft condition for preventing damage thereto and to return to said earthworking operative position upon the removal of said excessive draft condition, said earthworking means comprising, a bell crank foot piece pivotally suspended at one end thereof from said supporting frame means, an earthworking tool operatively secured to the other end of said bell crank foot piece and being movable with said bell crank foot piece to swing in a generally vertical direction between an earthworking operative position and a non-earthworking inoperative position, a toggle mechanism interconnecting said bell crank foot piece intermediate the ends thereof with said supporting frame means, said toggle mechanism including toggle links movable from a substantially on-center position in the earthworking operative position of said earthworking tool to an off-center position in the non-earthworking inoperative position of said earthworking tool, and spring means operatively connected to the fulcrum of said toggle links for urging said toggle links toward said substantially on-center position to restrainingly maintain said earthworking tool in the operative position, while allowing said toggle links to trip and move to said off-center position while said earthworking tool moves to said non-earthworking inoperative position and to urge the return of said toggle links and earthworking tool to said substantially on-center and earthworking operative positions, respectively, upon removal of said excessive draft condition.

2. In a planting apparatus, as set forth in claim 1, wherein said toggle links comprise a pair of toggle links and in which one of said toggle links is pivotally connected to said bell crank foot piece intermediate ends thereof, the other of said toggle links is pivotally connected to said supporting frame means and both said toggle links are pivotally connected to each other intermediate the connections to said bell crank foot piece and supporting frame means; and wherein the line of action of said spring means passes between the connections of said toggle links to said bell crank foot piece and supporting frame means and through said intermediate connection of said toggle links to each other.

3. In a planting apparatus, as set forth in claim 2, wherein said toggle links are of substantially the same length and the line of action of said spring means substantially bisects the angle between said toggle links when said toggle links are in said substantially on-center position so as to maximize the efficiency of said spring means in restrainingly maintaining said toggle links in said substantially on-center position and in urging the return of said earthworking tool to said earthworking operative position upon movement thereof to an inoperative position.

4. In a planting apparatus, as set forth in claim 1, including means for limiting the movement of said toggle links beyond said substantially on-center position in the direction opposite to said off-center position and wherein said spring means comprises tension spring means.

5. In a planting apparatus, as set froth in claim 1, including gauge means carried by said supporting frame means for following the earth contour so that said earthworking tool operates at a uniform depth and for relieving at least a portion of the weight of said planting apparatus supported by said earthworking tool upon the movement of said earthworking tool to said inoperative position and so that the efficiency of said spring means is enhanced in urging the return of said earthworking tool to said operative position.

6. In a planting apparatus, as set forth in claim 1, wherein said earthworking tool is adjustable vertically on said bell crank foot piece relative to said gauge means for adjusting the operative depth of said earthworking tool.

7. In a planting apparatus, as set forth in claim 1, wherein said earthworking tool comprises a furrow opening means and including means cooperating with said last-named furrow opening means for dispensing material to the furrow formed thereby.

8. In a planting apparatus, as set forth in claim 7, adapted for sod planting and further including a sod opening means disposed forwardly of and in operative relation to said last-named furrow opening means for opening the way for said last-named furrow opening means.

9. In a planting apparatus, as set forth in claim 1, wherein said planting furrow opening means and said press wheel are mounted for swinging vertical movement independently of each other.

* * * * *